Figure 1:
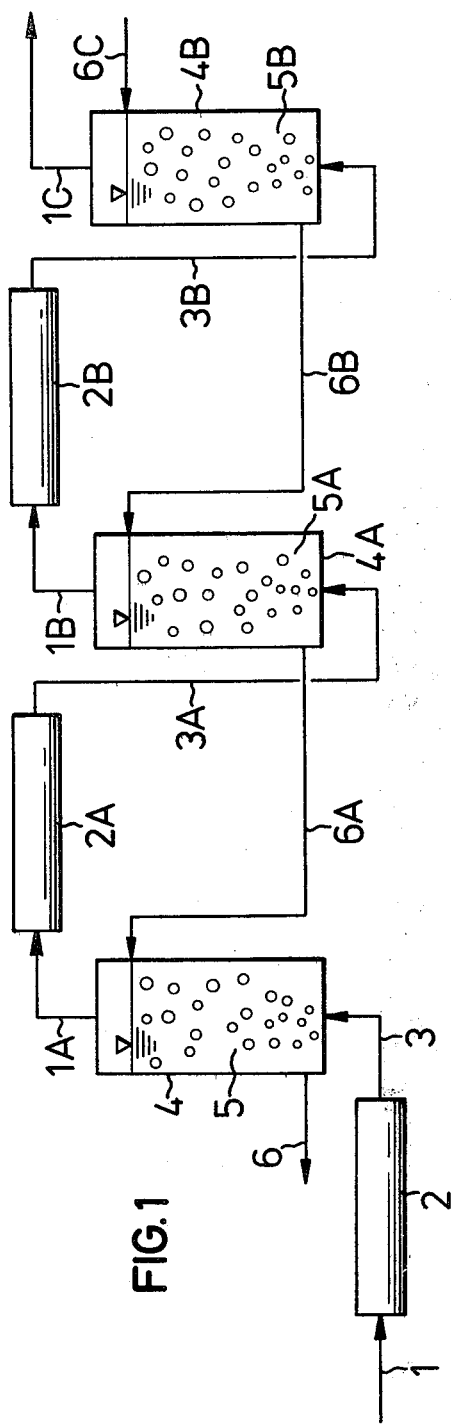

United States Patent [19]

Herbrechtsmeier et al.

[11] 4,309,396

[45] Jan. 5, 1982

[54] PROCESS FOR THE ABSORPTION OF NITROUS GASES

[75] Inventors: Peter Herbrechtsmeier, Hofheim am Taunus; Rudolf Steiner, Sulzbach; Herbert Vilcsek, Wiesbaden, all of Fed. Rep. of Germany

[73] Assignee: Hoechst Aktiengesellschaft, Frankfurt am Main, Fed. Rep. of Germany

[21] Appl. No.: 191,273

[22] Filed: Sep. 26, 1980

[30] Foreign Application Priority Data

Sep. 29, 1979 [DE] Fed. Rep. of Germany ....... 2939674

[51] Int. Cl.$^3$ .............................................. C01B 21/40
[52] U.S. Cl. .................................... 423/393; 423/235; 423/395
[58] Field of Search ............... 423/235, 393, 394, 395; 261/113

[56] References Cited

U.S. PATENT DOCUMENTS

| | | | |
|---|---|---|---|
| 1,355,357 | 10/1920 | Quinan | 423/393 |
| 2,072,947 | 3/1937 | Fogler et al. | 423/395 |
| 3,941,572 | 3/1976 | Uehiyama et al. | 261/113 |
| 4,183,902 | 1/1980 | Hashimoto et al. | 423/235 |
| 4,183,906 | 1/1980 | Watson et al. | 423/393 X |

*Primary Examiner*—G. O. Peters
*Attorney, Agent, or Firm*—Curtis, Morris & Safford

[57] ABSTRACT

Nitric oxides can be absorbed from gas mixtures containing nitric oxides (NO and $NO_2$) and oxygen by absorption with aqueous solutions. According to the invention, the absorption is effected in bubble columns, superficial velocities of 2 to 30 cm/second being maintained. It is advantageous to connect several bubble columns in series such that the gas and absorption liquid pass in counter-current to one another. In this embodiment, considerably less counter-current stages are required to achieve a high degree of absorption of $NO_x$ than in the case of conventional processes. At superficial velocities of 10 to 30 cm/second, large bubbles of gas can rapidly form from the gas introduced and can interact with the absorption liquid only with difficulty. In this case, gas distributor devices are incorporated in the bubble column. Since $NO_2$ is more readily absorbed than NO, it is advantageous to connect flow reactors, in which $NO_2$ is formed from NO and $O_2$, upstream of the bubble columns.

7 Claims, 5 Drawing Figures

PROCESS FOR THE ABSORPTION OF NITROUS GASES

The present invention relates to an improved process for the absorption of nitrous gases in liquids.

The absorption of nitrous gases in water is carried out as a large-scale industrial process in the manufacture of nitric acid. Whereas packed columns were used in the past as gas/liquid contact apparatuses for this absorption, the trend today is to use tray columns [E. Bahari, Nitric Acid Manufacture, Chem. Proc. Engineering (1965) 16].

In designing these absorption units consideration is given to the fact that increasing the pressure and reducing the temperature in the column increases the degree of absorption. Operations which proceed during absorption can be described by the following overall equations:

$$2\ NO_{(g)} + O_{2(g)} = 2\ NO_{2(g)} \quad (1)$$

$$3\ NO_2{(g)} + H_2O_{(l)} = 2\ HNO_{3(l)} + NO_{(g)} \quad (2)$$

with the indices (g) for the gas phase and (l) for the liquid phase. It is known that the homogeneous gas phase oxidation (1) is the step which determines the rate for the overall reaction (1) plus (2). A reduction in the temperature and an increase in the pressure shorten the oxidation time. In addition, the degree of oxidation of $NO_x$ in the gas introduced into the absorption column and with this also the degree of absorption in a stage can be increased by increasing the residence time of the gas and the gas space between the individual absorption stages. Nevertheless, with the large column volumes which are already needed, limits are imposed on such an increase by stability problems in the column construction and by an impairment of the stage efficiency in the packed column or tray column.

Absorption columns which are packed with Raschig rings and through which dilute nitric acid flows, or tray columns are still employed for the absorption of nitrous gases in industry. However, it is difficult to remove the last residues of nitric oxides with these columns (Ullmanns Enzyklopädie der Technischen Chemie (Ullmann's Encyclopaedia of Industrial Chemistry), 3rd edition, Volume 15, page 26). The effectiveness of the absorption of nitrous gases is not particularly high either when packed columns are used or when tray columns are used. Very large absorber units must therefore be used in industry in order to achieve a small residual gas concentration of $NO_x$.

Therefore, it is an object of the invention to provide a process for the absorption of nitrous gases which, is distinguished by a higher degree of absorption of $NO_x$ in a stage. That is, for the same effect and a given height of construction, it enables the number of absorber units to be minimized and the total volume of the absorption plant thereby simultaneously to be reduced in comparison with conventional plants.

The degree of absorption of $NO_x$ in a stage (expressed in %) is given by the expression $(V_E\text{-}V_A/V_E) \cdot 100$ In this expression, $V_E$ is the concentration, in a gas, of $NO_x$ which is passed into an intensely backmixed layer of an absorption liquid, and $V_A$ is the concentration, in a gas, of $NO_x$ which leaves this absorbing layer of liquid. ($NO_x$ means $NO + NO_2$). In a tray column, such a layer of liquid is in operation on each tray, so that an actual tray formally corresponds to a stage, defined here, which is filled with absorption liquid.

In the case of packed columns, there is neither a corresponding layer of liquid nor backmixing in the vertical direction.

In packed columns, analogous separation units can be determined by known experimental methods, so that the column height which corresponds to a separation stage and hence to the stage, defined here, which is filled with liquid, can be indicated. $V_E$ and $V_A$ for nitrous gases must then be determined experimentally for the section of the packed column which corresponds to a stage. The degree of absorption of $NO_x$ in a stage can thus also be determined for packed columns.

A process has now been found for the removal of nitric oxides from gas mixtures containing $NO_2$, NO and $O_2$ by absorption, which comprises continuously passing the gas mixture, upwards and at superficial velocities of 2 to 10 cm/s, through a bubble column filled with an aqueous absorbent. Bubble columns without packing are preferred.

FIGS. 1–5, more fully described below, depict apparatus suitable for carrying out the invention.

The gas passed into the bubble column contains NO, $O_2$ and $NO_2$ (or $N_2O_4$ and $N_2O_3$ in equilibrium). In addition to the absorption of $NO_2$, oxidation of NO can also take place in the bubble column. However, the gas which leaves the bubble column as a rule still contains, from the nitrogen oxides, chiefly only NO.

A given $NO_2$ content can indeed likewise largely be removed by a packed column or tray column. However, the height of construction of a device for the absorption of nitric oxide can be reduced considerably by using a bubble column.

The tray columns employed in industry for the absorption of $NO_2$ are usually operated with liquid layer heights of 30 to 70 mm per tray, the gas passed through forming a bubbling layer on each tray. In this case no dispersed phase can be clearly defined. In contrast, in the mode of operation customary for bubble columns, the gas phase is present as a disperse phase and the liquid is present as a continuous phase. The superficial gas velocities which are used in the process according to the invention are also considerably lower than the values customary when tray columns are used.

The liquid layer height (aqueous absorbent) in the bubble column is advantageously at least 15 cm, preferably at least 30 cm. The height of the bubble column thereby has a greater influence on the degree of absorption, the lower the initial $NO_x$ concentration and the higher the superficial gas velocity. Relative gas contents in the bubble column of 5 to 30% by volume, in particular 5 to 20% by volume, are advantageous. In general, only $NO_2$ is absorbed by the liquid absorbent in the bubble column. Only small amounts of NO dissolve directly, and the NO should advantageously be oxidized to $NO_2$ before absorption. The only disadvantage of oxidation by gaseous oxygen is that this reaction takes time and, especially at low NO concentrations, proceeds very slowly (because the rate of reaction is proportional to the square of the NO concentration).

An advantageous embodiment of the invention thus comprises continuously passing a gas mixture containing $O_2$ and NO, but only a small amount of $NO_2$, through a flow tube (tube reactor) before introduction into the bubble column, further $NO_2$ being formed from NO and $O_2$ in a time-dependent reaction. It has been found that, for the same reaction volume, a flow tube leads to a considerably higher conversion than a stirred kettle. In this variant, less steps are thus required for a good absorption of $NO_2$ than in known processes. The use of a flow reactor for the oxidation of NO is indeed known from German Patent Specification No. 1,299,610. However, bubble columns have not yet been referred to in this patent specification.

In this connection, a flow tube is understood as a tube which (in circular cross-section) has a length at least twice, but preferably at least ten times, its diameter. In the case of a non-circular cross-sectional area (F), the value $1.1284\sqrt{F}$ replaces the diameter. A narrow residence time spectrum of the gases which leave the oxidation chamber should thereby be achieved.

Bodenstein numbers above 2 are advantageous for the operation of the reaction tube (the Bodenstein number is defined by the expression gas velocity × length of the tube/diffusion coefficient in the longitudinal direction). The gas velocity in the tube reactor is not critical. Velocities of 0.01 m/s to 10 m/s are preferred. Moreover, the residence time of the gas in the tube reactor is also of significance for the degree of conversion of NO to $NO_2$. Preferred residence times are 10 to 300 seconds/tube reactor unit, in particular 20 to 200 and particularly preferably 20 to 80 seconds/tube reactor unit. The following table shows the dependence on the residence time and degree of oxidation for three different concentrations of NO.

| Feed gas | | | Degree of |
| --- | --- | --- | --- |
| Concentration of NO | Residual constituents | Residence time | oxidation of NO |
| 11 (% by volume) | air | 10–30 (seconds) | >90% |
| 2 | 8% by volume of $O_2$ and 90% by volume of $N_2$ | 10–100 | >30% |
| 0.2–1 | 8% by volume of $O_2$ and $N_2$ as the remainder | 10–200 | >5% |

These values approximately correspond to the values given in Ullmann, loc. cit. page 24.

Since laminar flow in a reaction tube has a parabolic flow profile, it is advantageous to produce turbulent flow with a plug-like flow profile by the geometry of the tube and the gas velocity or by built-in fitments.

The advantages which can be achieved with this embodiment of the process according to the invention are, in particular, that it is possible to carry out the rate-determining gas phase reaction according to equation (1) under flow tube conditions without constructional problems after any absorption stage by separation of the absorption space from the oxidation space. In the case of the present oxidation of NO in the flow tube (with an overall order of reaction of 3), it is possible thereby to achieve a considerable reduction in the oxidation space, which, for constructional reasons, can be kept only comparatively small in packed columns and tray columns and in these columns is comparatively more intensively backmixed. This variant is particularly important if the gas to be absorbed contains less than 10% by volume of NO.

It is particularly advantageous for the superficial velocity in the bubble column to be 2 to 10 cm/second. "Superficial velocity" is understood as the quotient of the gas flow through the bubble column (measured in volume/unit time) and the free cross-section of the bubble column (area). The absorption is impaired to a considerable extent at superficial velocities of over 10 cm/second. Superficial velocities of less than 2 cm/second effect only a slight further improvement but are uneconomical, because of the low utilization of the capacity of the bubble column.

In many cases, a single treatment of the gas mixture containing NO in the tube reactor and bubble column is not sufficient. In these cases, the treatment in the tube reactor and the bubble column is repeated several times, in particular in a cascade of 2 to 10 tube reactors and bubble columns connected alternately in series. Surprisingly, it is found that with a 4-stage absorption process it is already possible to achieve $NO_x$ off-gas values which can otherwise be achieved only with a larger number of stages in the counter-current process.

Figure 2:
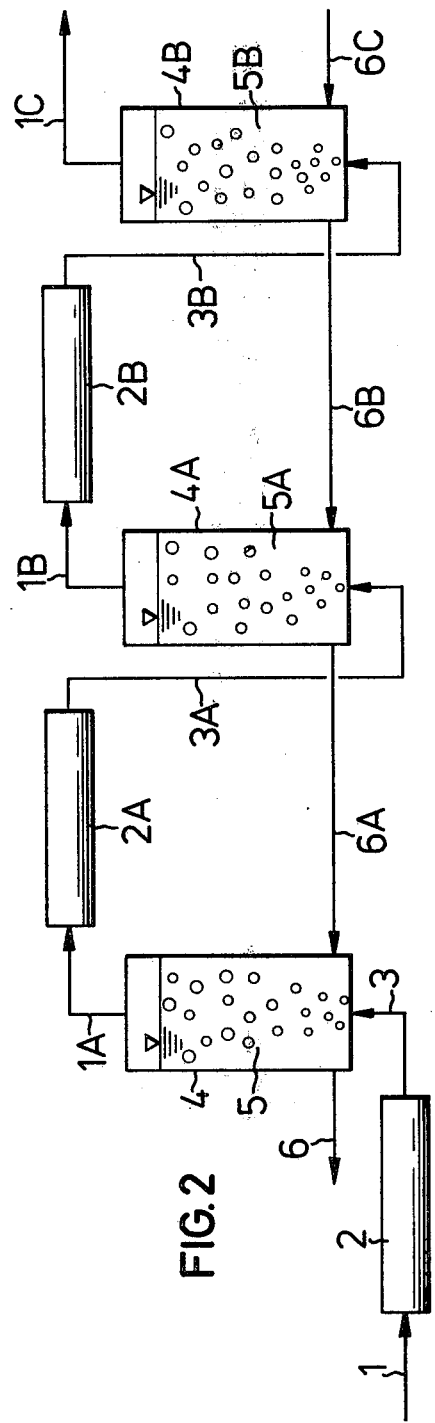

The liquid phase in such a cascade can be worked up separately in each stage. It can also be passed through continuously in co-current or counter-current to the gas phase. The liquid can be fed in at any desired point of the bubble column (for example at the top or at the bottom). These process variants are shown in FIGS. 1 and 2.

Gas (containing NO, $O_2$ and some $NO_2$) is passed into the tube reactor 2 (2A, 2B etc.) through line 1 (1A, 1B etc.). The gas leaving the tube reactor (with an increased content of $NO_2$) passes via line 3 (3A, 3B etc.) into the bubble column 4 (4A, 4B etc.), which is filled with the absorption liquid 5 (5A, 5B etc.). The gas leaving the bubble column, which has a decreased content of $NO_2$, can be treated repeatedly by this process. The absorption liquid is made to flow in counter-current to the gas: the absorption liquid is removed from the bubble column 5A (5B, 5C etc.) at the bottom via line 6A(6B, 6C etc.) and is fed into the bubble column 5 (5A, 5B etc.) at the top (shown in FIG. 1) or at the bottom (shown in FIG. 3). This cascade process can also advantageously be used for the manufacture of nitric acid if water or dilute nitric acid is used as the absorbent. The absorption liquid is removed through line 6.

In general, the content of $NO_x$ in the gas falls after each stage. Further oxidation of the nitric oxide to give $NO_2$ thus proceeds more and more slowly. For this reason, it is advantageous to allow the volume of the tube reactors to increase progressively from stage to stage, and at least to remain the same.

The process according to the invention can in principle be applied to all the known aqueous absorbents for nitric oxides. It is particularly preferably applied to alkaline absorbents which have a pH value above 7 and contain, for example, sodium hydroxide solution or calcium hydroxide. A mixture of nitrite and nitrate is thereby formed from the $NO_2$.

Other possible absorbents are: aqueous alkaline solutions of $H_2O_2$ (also absorb NO), aqueous alkali metal carbonate solutions, alkaline thiosulfate solutions, sodium sulfite solutions, solutions of ozone in water, aqueous solutions of dimethylsulfoxide, solutions of $KMnO_4$ in water and alkaline solutions of chlorite.

It is somewhat more difficult to remove the nitric oxides using pure water and acid aqueous absorbents since, in this case—according to equation (2)—nitric oxide is also formed, in addition to nitric acid. This problem can be solved, however, by increasing the number of tube reactors and bubble columns, and if necessary by reducing the temperature and increasing the residence time. The advantage of using acid, aqueous absorbents, in particular aqueous nitric acid, is that free nitric acid is formed as the reaction product and can be obtained in concentrated form by industrial processes which are in themselves known. It is particularly advantageous to use aqueous nitric acid with a content of 5 to 70, in particular 10 to 40% by weight of $HNO_3$ as the absorbent.

In the conventional nitric acid plants, more than 20 absorption stages are generally necessary, depending on the absorption pressure, in order to achieve $NO_x$ off-gas concentrations of less than 0.2%, whereas in the process according to the invention, only about 5 absorber units consisting of a tube reactor and a bubble column are needed to achieve the same off-gas concentration. A bubble column can be regarded as one absorption stage.

A further advantage of a non-integrated construction of the absorption space and oxidation space is that it is possible to use a different material for the gas phase reactor (in this case a flow tube) than for the oxidation reactor (in this case a bubble column) without causing problems. The flow tube could thus be manufactured, for example, from inexpensive corrosionresistant plastic.

Figure 3:
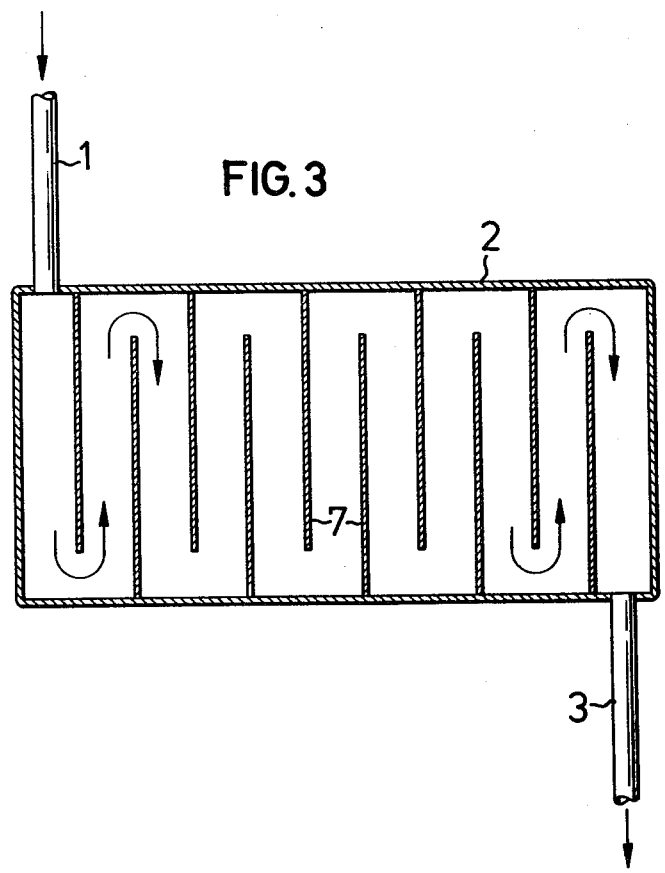

Moreover, a box-shaped construction with (approximately) a rectangular outline can also be chosen for the tube reactor, baffles which are arranged mutually staggered and which lengthen the path of the gas being incorporated. Using this construction, long path lengths for the gas can be accommodated in a small space in a given tube reactor volume without using an expensive tube construction. The outline of such a unit is shown in FIG. 3. In this unit, the gas flows through line (1) into the flow reactor (2), flows past the baffle plates (7) and leaves (2) again through line (3).

Since oxygen is necessary for the oxidation of NO to $NO_2$, oxygen must be present in each stage (combination of tube reactor and bubble column). Fresh oxygen can be added after each absorption stage, but it is also possible to introduce a sufficient amount of oxygen only once, and in particular in the first stage.

Although the oxidation of NO proceeds more rapidly at higher pressures, the pressure is not critical for the process according to the invention. For economic reasons, pressures of 1 to 50 bars are preferred. The process according to the invention is preferably carried out at temperatures from 0° to 50° C., in particular 10° to 40° C. The rate of formation of $NO_2$ from NO decreases at higher temperatures.

If nitrous gases are to be absorbed in a simple bubble column and superficial gas velocities of 10 cm/second or more are used, the degree of absorption decreases considerably. At the same time, large bubbles are formed. It has been found that high degrees of absorption are achieved, even at relatively high gas velocities, if the large bubbles once formed are simply dispersed again into smaller bubbles. The large bubbles formed are preferably repeatedly dispersed by several gas distributor devices (for example sintered plates or perforated plates) arranged one above the other.

Figure 4:
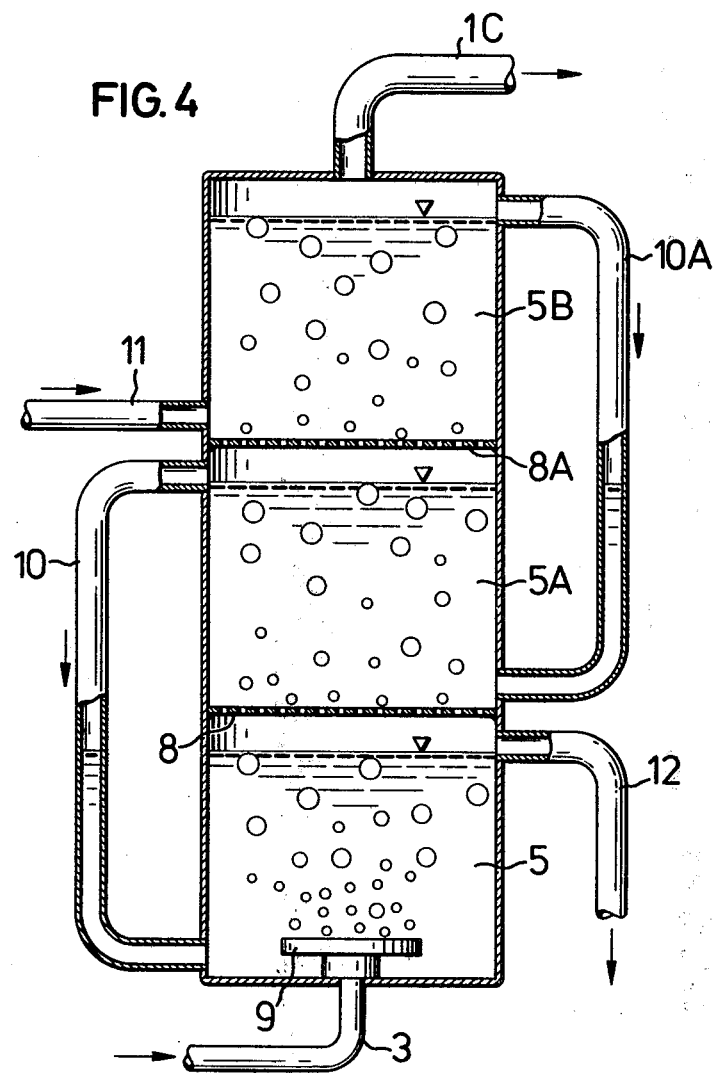

This division of the bubble column is shown in FIG. 4. The bubble column is divided into 3 zones (each filled with a liquid phase (5, 5A, 5B) with a cushion of gas on top) by the two additional gas distributor devices (perforated plates are shown here) labeled (8) and (8A)). Frit (9) at the bottom inlet for the gas in the bubble column, serves to finely distribute the gas entering the column.

It may be necessary to renew the aqueous absorbent (5, 5A, 5B) from time to time or continuously. For this, it is possible either to renew the liquid phase separately in each zone or (as in FIG. 4) to transport the spent liquid phase in counter-current to the gas stream. In the three-stage bubble column according to FIG. 4, this is effected by means of the overflow pipes 10 and 10A. Fresh aqueous absorbent is introduced through line 11 and spent absorbent is removed through line 12. Gas is fed in through line 3 and removed through line 1C.

In the case of a continuous procedure, it is particularly advantageous to pass both the liquid and the gas through in co-current upward flow (introduction of the liquid through line 12, removal through line 11). As a result of oscillation of the layer of liquid, liquid briefly sloshes into the gas distributor immediately above, so that the liquid phase is conveyed upwards to the bubble column.

In such a co-current stage, the external lines (10, 10A) for transportation of the liquid can then be saved.

This embodiment of the process according to the invention for removing nitric oxides from gas mixtures containing $NO_2$, NO and $O_2$ by absorption comprises passing the gas mixture, upwards and at superficial velocities of 10 to 30 cm/second, through a bubble column which is divided by gas distributor devices into several zones arranged one above the other, and dispersing the large bubbles of gas, formed when the gas rises in the aqueous absorbent, into smaller bubbles again by the gas distributor devices incorporated. Superficial velocities of 10 to 25 cm/second are preferred.

In general, the number of gas distributor devices to be employed is higher, the higher the sperficial gas velocity.

Figure 5:
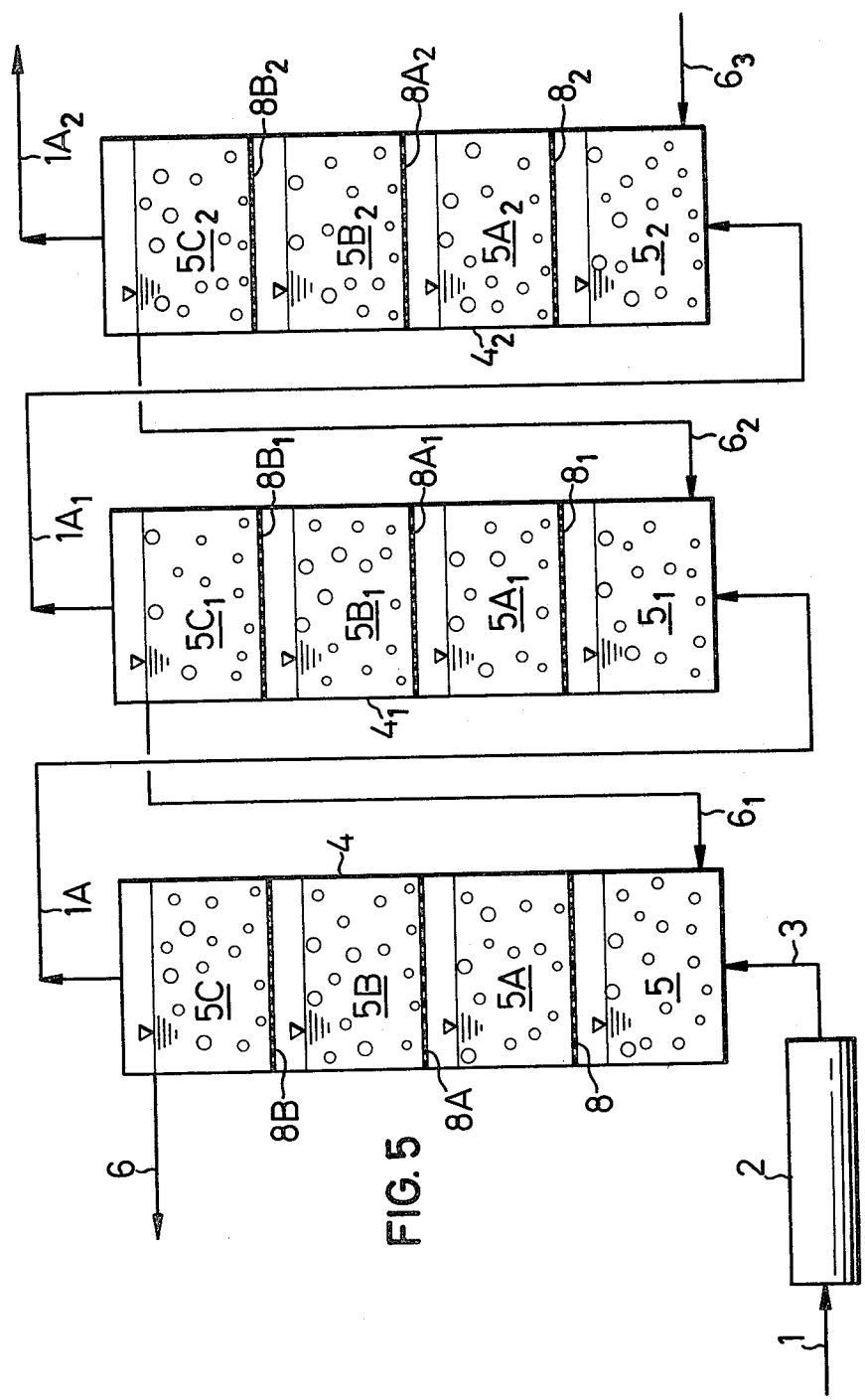

FIG. 5 shows a cascade of bubble columns, in which each bubble column 4 ($4_1$, $4_2$) is divided into four absorption zones (for example 5, 5B, 5C) by three gas distributor devices 8, 8A and 8B ($8_1$, $8A_1$, $8B_1$ and $8_2$, $8A_2$, $8B_2$). Overall, the liquid is passed through in counter-current to the gas phase, but in the individual bubble columns provided with gas distributor devices it is passed through in co-current with the gas phase. This is therefore a combined co-current/counter-current process.

Gas containing nitric oxides is introduced through line 3 (1A, $1A_1$) into the bottom of the divided bubble columns 4 ($4_1$, $4_2$) and the treated gas is removed at the top and introduced into the bottom of the following bubble column again. The absorption liquid is introduced through line $6_3$, passes through the system (column $4_2$, line $6_2$, column $4_1$, line $6_1$, column 4) and is discharged again through line 6. The individual bubble columns (4, $4_1$, $4_2$) of FIG. 5 can, of course, also be arranged one above the other in an integrated column construction. The tube reactor (2) can also be omitted.

Such a cascade construction is based on the knowledge that, in contrast to the state of the art, a few counter-current stages are already sufficient to achieve a high degree of absorption of $NO_x$. The number of additional gas distributors per stage depends on the superficial gas velocity. 0–5, preferably 2–3, additional gas distributors per bubble column are sufficient for superficial velocities of up to 30 cm/second. More gas distributors are possible but result in only a slight additional improvement. If the columns are divided, it is sufficient for the level of the liquid to be 20–100 cm above the gas distributors.

The method described for dispersing large gas bubbles formed can, of course, also be applied if the gas mixture containing $NO_2$, NO and $O_2$ is obtained in a flow tube. This embodiment of the process according to the invention for removing nitric oxides from gas mixtures containing NO and O₂ thus comprises continuously passing the gas mixture through a flow tube (tube reactor), in which NO₂ is formed, and then passing the gas mixture, upwards and at superficial velocities of 8 to 30 cm/second through a bubble column which is filled with aqueous absorbent and is divided by gas distributor devices into several zones arranged one above the other, and dispersing the large bubbles of gas, formed when the gas rises in the aqueous absorbent, into smaller bubbles again by the gas distributor devices incorporated.

For a bubble column which has no additional distributor devices and is filled with dilute nitric acid (10% strength by weight) and into which a gas containing 11% by volume of NO (remainder: air) is introduced at the bottom under 1.2 bars and at 20° C., the following approximate relationship exists between the superficial gas velocity w[cm/second], the level of fill H[cm] and the degree of absorption A in the range of $3 \leq w \leq 10$ [cm/second] and $10 \leq H \leq 80$ [cm]:

$$A_{11} = [0.75 + 0.00031H] - [0.025 - 0.00022H]w.$$

If a gas containing only 2% by volume of NO (remainder: air) is used, the corresponding approximate formula is as follows:

$$A_2 = 0.49 + 0.00225H.$$

The absorption of nitric oxides in bubble columns is already known from German Offenlegungsschrift No. 1,767,201. However, the process according to this literature reference, which relates to the manufacture of ammonium nitrilotrisulfonate, is carried out completely differently.

GENERAL EXPERIMENTAL PROCEDURE

Gas mixtures which contained NO and O₂ were passed through a cylindrical tube reactor (diameter: 18 mm; length: 18.5 m; volume 4.7 l) or through a stirred empty kettle (volume: 4.7 l). The pressure was in each case 1.28 bars and the temperature was 22° C. The gas mixtures formed, which contained NO, NO₂ and O₂, were then passed into the bottom of a cylindrical bubble column (internal diameter: 10 cm; gassed height: 1 m). The gas was distributed uniformly over the cross-section of the column by a sintered glass plate.

The concentrations of NO₂ and NO in the gas at the gas inlet (downstream of the tube reactor or stirred kettle) and at the gas outlet of the bubble column were determined by mass spectrometry. The degree of absorption of NO$_x$ (sum of NO and NO₂) in a stage which is calculated therefrom is given in tabular form.

EXAMPLE 1

Metering of the gas: 110 l/hour of NO and 890 l/hour of air, corresponding to 11% by volume of NO.
Absorbent: aqueous HNO₃ solution (10% strength by weight).

| Degree of absorption | |
|---|---|
| with a tube reactor | NO$_x$ absorption of 74% |
| with a stirred kettle | NO$_x$ absorption of 68% |

EXAMPLE 2

Metering of the gas: 20 l/hour of NO, 160 l/hour of O₂ and 805 l/hour of N₂, corresponding to 2% by volume of NO.
Absorbent: as in Example 1.

| Degree of absorption | |
|---|---|
| with a tube reactor: | NO$_x$ absorption of 58% |
| with a stirred kettle: | NO$_x$ absorption of 38% |

EXAMPLE 3

Metering of the gas: as in Example 2.
Absorbent: water.
Degree of absorption (with a tube reactor): NO$_x$ absorption of 87%.

The degrees of absorption in Examples 1 and 2 show that the absorption of NO$_x$ proceeds better with the combination of tube reactor and bubble column than with a combination of stirred kettle and bubble column. The reason for this is that, in the tube reactor, the proportion of NO₂ in the gas (for the same reaction volume and the same average residence time) is increased to a greater extent than in a (ideal) stirred kettle and the proportion of NO, which can be absorbed only to a small extent, is thus reduced.

EXAMPLE 4

The pressure, temperature and absorbent were chosen as in Example 1.
Composition of the gas: 11% by volume of NO, remainder: air.
The rate at which the gas is metered and hence the superficial velocity in the bubble column were varied. The tube reactor used in Examples 1 to 3 was connected upstream of the bubble column. The results are found in the following table.

| Metering of the gas | Superficial gas velocity | Degree of absorption |
|---|---|---|
| 845 l/hour | 3 cm/second | 76% |
| 1,130 | 4 | 74 |
| 1,415 | 5 | 73 |
| 2,260 | 8 | 70 |

EXAMPLE 5

Example 1 was repeated (with a tube reactor), but 40% strength aqueous nitric acid was chosen as the absorbent.
Degree of absorption: 60%
If only 30% strength aqueous nitric acid is used, the degree of absorption rises to 72%.

EXAMPLE 6

Example 2 was repeated (with a tube reactor), but sodium hydroxide solution (2% strength by weight) was chosen as the absorbent.
Degree of absorption: 92%.

EXAMPLE 7

A gas mixture of 10% by volume of NO and 90% by volume of air was passed through a cylindrical tube reactor (diameter: 18 mm; length: 18.5 m; volume: 4.7 l). The gas mixtures formed, which contained NO, NO₂, $O_2$ and $N_2$, were then passed into a cylindrical three-stage bubble column (similar to FIG. 4) (internal diameter: 6 cm, gassed height: 30 cm/stage). In each stage, distribution of the gas took place via a sintered glass plate. The overall height of the bubble column was 120 cm. A cushion of gas formed over the gassed layer of liquid in each stage, and in the first two stages was in each case forced into the next stage, and in the last stage left the bubble column. Dilute nitric acid (25% strength by weight of $HNO_3$) at 35° C. was used as the aqueous absorbent in all three stages. The following degrees of absorption were calculated from the initial concentrations of $NO_x$ measured before the first stage and the final concentration of $NO_x$ after the last stage of the cascade of bubble columns:

| Superficial gas velocity | Degree of absorption |
| --- | --- |
| 12 cm/second | 81% |
| 16 cm/second | 66% |

EXAMPLE 8

A gas mixture (11% by volume of NO, remainder: air) was introduced directly into a bubble column which was charged with aqueous nitric acid (10% strength by weight). The level of fill and superficial gas velocity were varied. The results are found in the following table.

| Degree of absorption | Height of the gassed column | Superficial gas velocity |
| --- | --- | --- |
| 75% | 80 [cm] | 3 [cm/second] |
| 71 | 30 | 3 |
| 73 | 80 | 5 |
| 68 | 30 | 5 |
| 70 | 80 | 10 |
| 57 | 30 | 10 |
| 68 | 10 | 3 |
| 73 | 60 | 3 |

EXAMPLE 9

Example 8 was repeated, but another gas mixture (2% by volume of NO, remainder: air) was employed and the superficial velocity was kept constant at 3 cm/second. The dependence of the degree of absorption on the height of the bubble column is found in the following table

| Degree of absorption | Height of the gassed column |
| --- | --- |
| 50% | 10 cm |
| 54% | 20 cm |
| 63% | 40 cm |
| 66% | 80 cm |

EXAMPLE 10

Nitric oxides were absorbed continuously in a cascade of bubble columns according to FIG. 1 (consisting of 4 bubble columns and 4 tube reactors) and nitric acid was thereby obtained.

The gassed height of the bubble columns was in each case 1.8 m and the diameter of the columns was 10 cm. The tube reactors had a diameter of 1.9 cm and a length of 16.6 m. The gas throughput was 850 liters (S.T.P.)/hour. The feed gas before the first tube reactor contained 11% by volume of NO (remainder: air). The gas after the first tube reactor (before the first bubble column) contained 12% by volume of $NO_2$ and 14% by volume of $O_2$ (remainder: nitrogen, rare gases and $CO_2$).

230 ml/hour of water were metered continuously into the last bubble column and were converted into 1.5% strength nitric acid in this column. 6.5% strength nitric acid was formed in the third bubble column, 31% strength nitric acid was formed in the second bubble column and 55% strength nitric acid was formed in the first bubble column. This nitric acid was removed continuously.

The starting pressure before the first bubble column was 1.75 bars. The gas left the cascade under normal pressure. The temperature was kept at 22° C. in all the bubble columns. Under these experimental conditions, an off-gas concentration of 3,300 ppm of $NO_x$ could be achieved after the fourth bubble column.

EXAMPLE 11

The same cascade of bubble columns as in Example 10 was used. The gas throughput was 2.34 m$^3$/hour (S.T.P.). The feed gas before the first tube reactor contained 11% by volume of NO (remainder: air). The gas after the first tube reactor (before the first bubble column) contained 12% by volume of $NO_2$ and 14% by volume of $O_2$ (remainder: nitrogen, rare gases and $CO_2$).

590 ml/hour of water were metered continuously into the last bubble column and were converted into 1.5% strength nitric acid in this column. 8.7% strength nitric acid was formed in the third bubble column, 40% strength nitric acid was formed in the second bubble column and 60% strength nitric acid was formed in the first bubble column. This nitric acid was removed continuously. The starting pressure before the first bubble column was 3.1 bars. The gas left the cascade under a pressure of 2.35 bars. The temperature was kept at 22° C. in all the bubble columns. Under these experimental conditions, an off-gas concentration of 2,000 ppm $NO_x$ could be achieved after the fourth bubble column.

We claim:

1. A process for removing nitric oxides from gas mixtures by absorption which comprises the steps of:
continuously passing a gas mixture containing $NO_2$, NO and $O_2$ in an upward direction at a superficial velocity of 10 to 30 cm/second, through 1 to 6 zones of each of 2 to 5 bubble columns in series;
introducing an aqueous absorbent in a bottom end of each bubble column and removing said absorbent at a top end of each bubble column; and
dispersing large bubbles formed in each zone as the gas mixture rises in the aqueous absorbent into smaller bubbles.

2. Process as claimed claim 1, wherein the aqueous absorbent has a pH value of at least 7.

3. Process as claimed claim 1, wherein dilute nitric acid is used as the aqueous absorbent.

4. Process as claimed in claim 3, wherein an aqueous nitric acid with a content of 5 to 70% by weight of $HNO_3$, preferably 10 to 40% by weight of $HNO_3$, is used as the absorbent.

5. The process of claim 1, wherein the large bubbles are dispersed by passing them through a gas distributor device in each zone.

6. The process of claim 1, wherein the gas mixture is passed through 3 or 4 zones of each column.

7. The process of claim 1, wherein the superficial velocity is 10 to 25 cm/second.

* * * * *